(12) United States Patent
Shaw et al.

(10) Patent No.: US 6,363,342 B2
(45) Date of Patent: *Mar. 26, 2002

(54) SYSTEM FOR DEVELOPING WORD-PRONUNCIATION PAIRS

(75) Inventors: Rhonda Shaw; Roland Kuhn; Steve Pearson, all of Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/216,111

(22) Filed: Dec. 18, 1998

(51) Int. Cl.$^7$ .......................... G10L 13/00; G10L 13/04
(52) U.S. Cl. ...................... 704/220; 704/257; 704/251; 704/260
(58) Field of Search .................. 704/244, 245, 704/243, 251, 252, 253, 254, 258, 260, 257, 220

(56) References Cited

U.S. PATENT DOCUMENTS

| | | | |
|---|---|---|---|
| 4,831,654 A | | 5/1989 | Dick |
| 5,212,730 A | * | 5/1993 | Wheatley et al. ............ 704/243 |
| 5,278,943 A | * | 1/1994 | Gasper et al. ............... 704/200 |
| 5,384,893 A | * | 1/1995 | Hutchins ..................... 704/267 |
| 5,432,948 A | * | 7/1995 | Davis et al. ..................... 704/2 |
| 5,682,501 A | * | 10/1997 | Sharman ..................... 704/260 |
| 5,751,906 A | * | 5/1998 | Silverman ................... 704/260 |
| 5,794,197 A | * | 8/1998 | Alleva et al. ................ 704/255 |
| 5,832,434 A | * | 11/1998 | Meredith ..................... 704/260 |
| 5,835,892 A | * | 11/1998 | Kanno ........................ 704/257 |
| 5,933,804 A | * | 8/1999 | Huang et al. ................ 704/244 |
| 6,016,471 A | * | 1/2000 | Kuhn et al. .................. 704/266 |
| 6,029,132 A | * | 2/2000 | Kuhn et al. .................. 704/260 |
| 6,078,885 A | * | 6/2000 | Beutnagel ................... 704/258 |
| 6,092,044 A | * | 7/2000 | Baker et al. ................. 704/254 |
| 6,163,769 A | * | 12/2000 | Acero et al. ................. 704/260 |
| 6,230,131 B1 | * | 5/2001 | Kuhn et al. .................. 704/266 |
| 6,233,553 B1 | * | 5/2001 | Contolini et al. ........... 704/220 |

FOREIGN PATENT DOCUMENTS

EP    0 562 138 A1  *   9/1993  ............. G10L/5/06

* cited by examiner

Primary Examiner—William Korzuch
Assistant Examiner—Abul K. Azad
(74) Attorney, Agent, or Firm—Harness, Dickey & Pierce, P.L.C.

(57) ABSTRACT

An editing tool is provided for developing word-pronunciation pairs based on a spelled word input. The editing tool includes a transcription generator that receives the spelled word input from the user and generates a list of suggested phonetic transcriptions. The editor displays the list of suggested phonetic transcriptions to the user and provides a mechanism for selecting the desired pronunciation from the list of suggested phonetic transcriptions. The editing tool further includes a speech recognizer to aid the user in selecting the desired pronunciation from the list of suggested phonetic transcriptions based on speech data input that corresponds to the spelled word input, and a syllable editor that enables the user to manipulate a syllabic part of a selected pronunciation. Lastly, the desired pronunciation can be tested at any point through the use of a text-to-speech synthesizer that generates audible speech data for the selected phonetic transcription.

26 Claims, 5 Drawing Sheets

SYSTEM FOR DEVELOPING WORD-PRONUNCIATION PAIRS

BACKGROUND AND SUMMARY OF THE INVENTION

The present invention relates generally to speech recognition and speech synthesis systems. More particularly, the invention relates to developing word-pronunciation pairs.

Computer-implemented and automated speech technology today involves a confluence of many areas of expertise, ranging from linguistics and psychoacoustics, to digital signal processing and computer science. The traditionally separate problems of text-to-speech (TTS) synthesis and automatic speech recognition (ASR) actually present many opportunities to share technology. Traditionally, however, speech recognition and speech synthesis has been addressed as entirely separate disciplines, relying very little on the benefits that cross-pollination could have on both disciplines.

We have discovered techniques, described in this document for combining speech recognition and speech synthesis technologies to the mutual advantage of both disciplines in generating pronunciation dictionaries. Having a good pronunciation dictionary is key to both text-to-speech and automatic speech recognition applications. In the case of text-to-speech, the dictionary serves as the source of pronunciation for words entered by graphemic or spelled input. In automatic speech recognition applications, the dictionary serves as the lexicon of words that are known by the system. When training the speech recognition system, this lexicon identifies how each word is phonetically spelled, so that the speech models may be properly trained for each of the words In both speech synthesis and speech recognition applications, the quality and performance of the application may be highly dependent on the accuracy of the pronunciation dictionary. Typically, it is expensive and time consuming to develop a good pronunciation dictionary, because the only way to obtain accurate data has heretofore been through use of professional linguists, preferably a single one to guarantee consistency. The linguist painstakingly steps through each word and provides its phonetic transcription.

Phonetic pronunciation dictionaries are available for most of the major languages, although these dictionaries typically have a limited word coverage and do not adequately handle proper names, unusual and compound nouns, or foreign words. Publicly available dictionaries likewise fall short when used to obtain pronunciations for a dialect different from the one for which the system was trained or intended.

Currently available dictionaries also rarely match all of the requirements of a given system. Some systems (such as text-to-speech systems) need high accuracy; whereas other systems (such as some automatic speech recognition systems) can tolerate lower accuracy, but may require multiple valid pronunciations for each word. In general, the diversity in system requirements compounds the problem. Because there is no "one size fits all" pronunciation dictionary, the construction of good, application-specific dictionaries remains expensive.

The present invention provides a system and method for developing word-pronunciation pairs for use in a pronunciation dictionary. The invention provides a tool, which builds upon a window environment to provide a user-friendly methodology for defining, manipulating and storing the phonetic representation of word-pronunciation pairs in a pronunciation dictionary. Unlike other phonetic transcription tools, the invention requires no specific linguistic or phonetic knowledge to produce the pronunciation lexicon. It utilizes various techniques to quickly provide the best phonetic representation of a given word along with different means for "fine tuning" this phonetic representation to achieve the desired pronunciation. Immediate feedback to validate word-pronunciation pairs is also provided by incorporating a text-to-speech synthesizer. Applications will quickly become apparent as developments expand in areas where exceptions to the rules of pronunciation are common, such as streets, cities, proper names and other specialized terminology.

For a more complete understanding of the invention, its objects and advantages refer to the following specification and to the accompanying drawings.

DETAILED DESCRIPTION OF THE PREFERRED EMBODIMENTS

Figure 1:
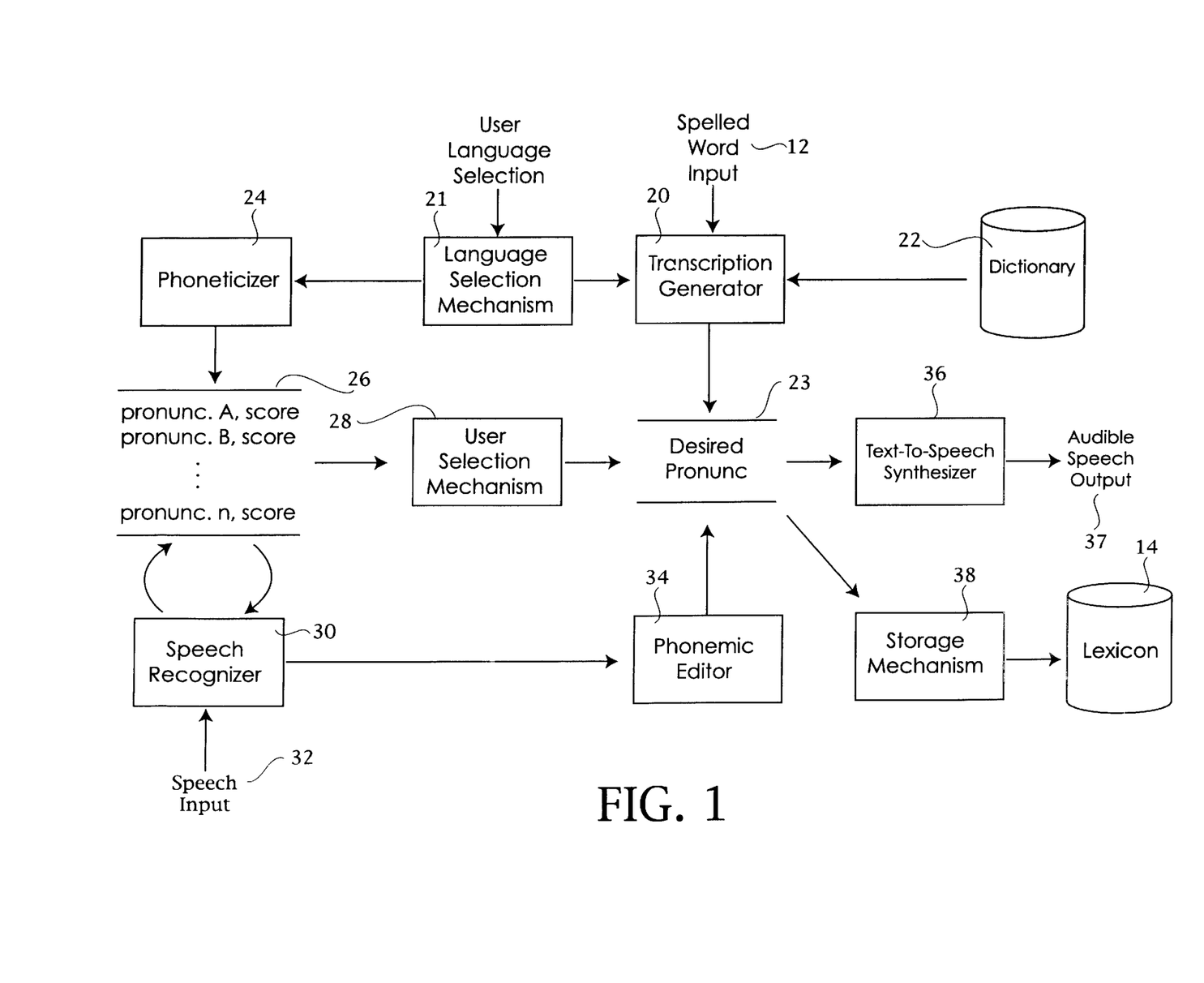
FIG. 1 is a block diagram illustrating the system and method of the present invention.

A word-pronunciation editor 10 for developing word-pronunciation pairs is depicted in FIG. 1. The editor 10 uses spelled word input 12 to develop word-pronunciation pairs that are in turn entered into a lexicon 14. The lexicon 14 of the present invention is a word-pronunciation dictionary comprised of ordered pairs of words and one or more associated phonetic transcriptions. As will be more fully explained, the lexicon 14 can be updated by adding word-pronunciation pairs or by revising pronunciations of existing word-pronunciation pairs.

A transcription generator 20 receives as input the spelled word 12. For illustration purposes it will be assumed that spelled words 12 are entered via a keyboard, although spelled words may be input through any convenient means, including by voice entry or data file. The transcription generator 20 may be configured in a variety of different ways depending on the system requirements. In a first preferred embodiment of the present invention, transcription generator 20 accesses a baseline dictionary 22 or conventional letter-to-sound rules to produce a suggested phonetic transcription 23.

In the description presented here, a distinction is made between phonetic transcriptions and morpheme transcriptions. The former represent words in terms of the phonemes in human speech when the word is spoken, whereas the latter represents an atomic unit (called morphs) from which larger words are made. For instance, a compound word such as "catwalk" may be treated morphemically as comprising the atomic units "cat" and "walk". In an alternative embodiment, the transcription generator 20 may also include a morphemic component.

In operation, an initial phonetic transcription of the spelled word 12 is derived through a lookup in the baseline dictionary 22. In the event no pronunciation is found for the spelled word, conventional letter-to-sound rules are used to generate an initial phonetic transcription. If the resulting pronunciation is unsatisfactory to the user, a phoneticizer 24 may provide additional suggested pronunciations for the spelled word 12. The phoneticizer 24 generates a list of suggested phonetic transcriptions 26 based on the spelled word input using a set of decision trees. Details of a suitable phoneticizer are provided below.

Each transcription in the suggested list 26 has a numeric value by which it can be compared with other transcriptions in the suggested list 26. Typically, these numeric scores are the byproduct of the transcription generation mechanism. For example, when the decision tree-based phoneticizer 24 is used, each phonetic transcription has associated with it a confidence level score. This confidence level score represents the cumulative score of the individual probabilities associated with each phoneme. As the reader will see from the description below, the leaf nodes of each decision tree in the phoneticizer 24 are populated with phonemes and their associated probabilities. These probabilities are numerically represented and can be used to generate a confidence level score. Although these confidence level scores are generally not displayed to the user, they are used to order the displayed list of n-best suggested transcriptions 26 as provided by the phoneticizer 24.

A user selection mechanism 28 allows the user to select a pronunciation from the list of suggested transcriptions 26 that matches the desired pronunciation.

An automatic speech recognizer 30 is incorporated into the editor 10 for aiding the user in quickly selecting the desired pronunciation from the list of suggested transcriptions 26. By using the confidence level score associated with each of the suggested transcriptions, the speech recognizer 30 may be used to reorder the list of suggested transcriptions 26. The speech recognizer 30 extracts phonetic information from a speech input signal 32, which corresponds to the spelled word input 12. Suitable sources of speech include: live human speech, audio recordings, speech databases, and speech synthesizers. The speech recognizer 30 then uses the speech signal 32 to reorder the list of suggested transcriptions 26, such that the transcription which most closely corresponds to the speech input signal 32 is placed at the top of the list of suggested transcriptions 26.

Figure 2:
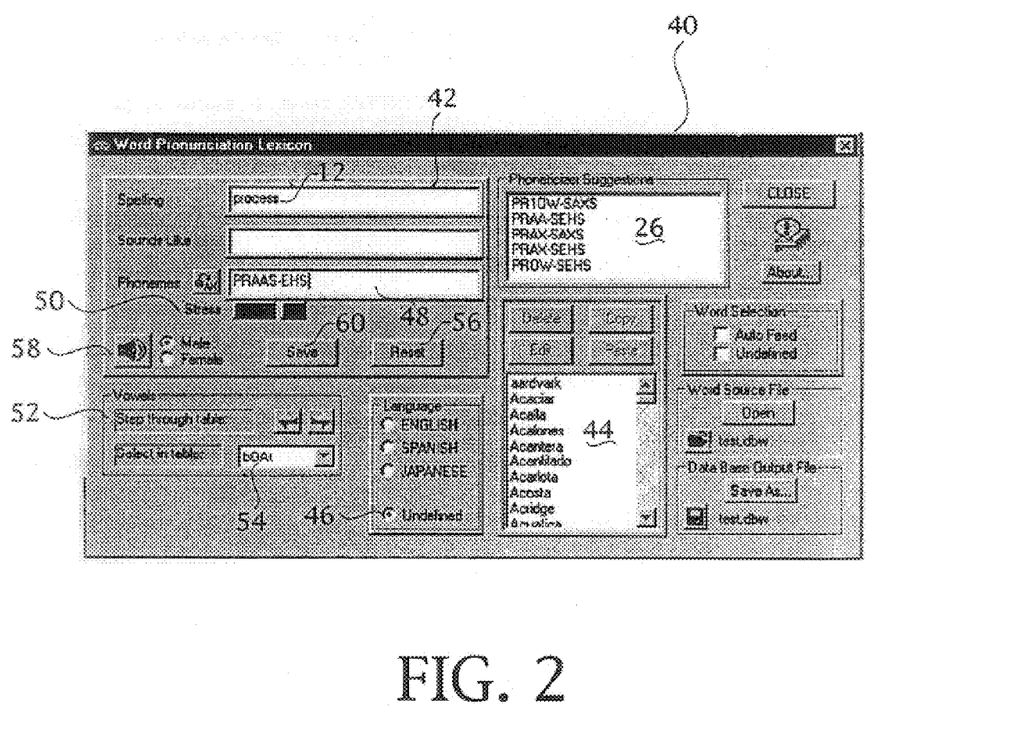
FIG. 2 illustrates an editing tool useful in implementing a system in accordance with the present invention.

As shown in FIG. 2, a graphical user interface 40 is the tool by which a user selects and manipulates the phonetic transcriptions provided by the transcription generator 20 and the phoneticizer 24. Initially, the spelled word input 12 is placed into a spelling field 42. If a phonetic transcription of the word 12 is provided by the baseline dictionary 22, then its corresponding phonetic representation defaults into the phonemes field 48; otherwise, conventional letter-to-sound rules are used to populate the phonemes field 48. The phonemic transcription displayed in the phonemes field 48 is hyphenated to demark the syllables which make up the word. In this way, a user can directly edit the individual syllables of the phoneme transcription in the phonemes field 48.

Alternatively, the spelled word input 12 may be selected from a word list 44 as provided by a word source file (e.g., a dictionary source). Highlighting any word in the word list 44 places that word in the spelling field 42 and its corresponding phonetic transcription in the phonemes field 48. As previously discussed, a list of n-best suggested phonetic transcriptions 26 is generated by phoneticizer 24 based upon the spelled word input 12. If the pronunciation in the phonemes field 48 is unsatisfactory, then the user preferably selects one of these phonetic transcriptions (that closely matches the desired pronunciation) to populate the phonemes field 48. Lastly, it is also envisioned that desired word input may be spoken by the user. This speech input is converted into a spelled word by the speech recognizer 30 which is in turn translated into a phonetic transcription as described above.

At any time, the user can specify in the language selection box 46 an operative language for the word-pronunciation editor 10. In response, the editor 10 automatically functions in a mode that corresponds to the selected language. For instance, the transcription generator 20 will access a dictionary that corresponds to the selected language, thereby displaying a phonetic transcription for the word input 12 in the selected language. To function properly, the phoneticizer 24, the speech recognizer 30 and the text-to-speech synthesizer 36 may also need to access input files and/or training data that corrrespond to the selected language. It is also envisioned that the user language selection may also alter the appearance of the user interface. In this way, the editor 10 facilitates the development of word-pronunciation pairs in the users native language.

Regardless of the language selection, the word-pronunciation editor 10 provides various means for manipulating syllabic portions of the phonetic transcription displayed in the phonemes field 48. A phonemic editor 34 (as shown in FIG. 1) provides the user a number of options for modifying an individual syllable of the phonetic transcription. For instance, stress (or emphasis) buttons 50 line up underneath the syllables in phonemes field 48. In this way, the user can select these buttons 50 to alter the stress applied to the syllable, thereby modifying the pronunciation of the word. Most often mispronunciation is a factor of the wrong vowel being used in a syllable. The user can also use the vowel step through button 52 and/or the vowel table list 54 to select different vowels to substitute for those appearing in the selected syllable of the phonemes field 48.

In one embodiment of the phonemic editor 34, the user speaks an individual syllable into a microphone (not shown) and the original text spelling that corresponds to its pronunciation is provided in the sounds like field 56. When the user has selected a particular syllable of the phonetic transcription in the phonemes field 48, then a corresponding phonemic representation of the speech input also replaces this selected syllable in the phonetic transcription. It should be noted that the speech input corresponding to an individual syllable is first translated into the corresponding text spelling by the speech recognizer 30. The phonemic editor 34 then converts this text spelling into the corresponding phonemic representation. In this way, one or more selected syllabic portions of the pronunciation may be replaced with a word known to sound similar to the desired pronunciation. Alternatively, the phonemic editor 38 presents the user with a menu of words based on the spoken vowel sounds and the user selects the word that corresponds to the desired vowel pronunciation of the syllable. If during the editing process the user becomes dissatisfied with the pronunciation displayed in the phonemes field 48, then the phonetic transcription can be reset to its original state by selecting the reset button 56.

By clicking on a speaker icon 58, the user may also test the current pronunciation displayed in the phonemes field 48. Returning to FIG. 1, a text-to-speech synthesizer 36 generates audible speech data 37 from the current pronunciation found in the phonemes field 48. Generating audible speech data from a phonetic transcription is well known to one skilled in the art. Once the user has completed editing the phonetic transcription, a storage mechanism 38 can be initiated (via the save button 60) to update the desired word-pronunciation pair in lexicon 14.

Phoneticizer

Figure 3:
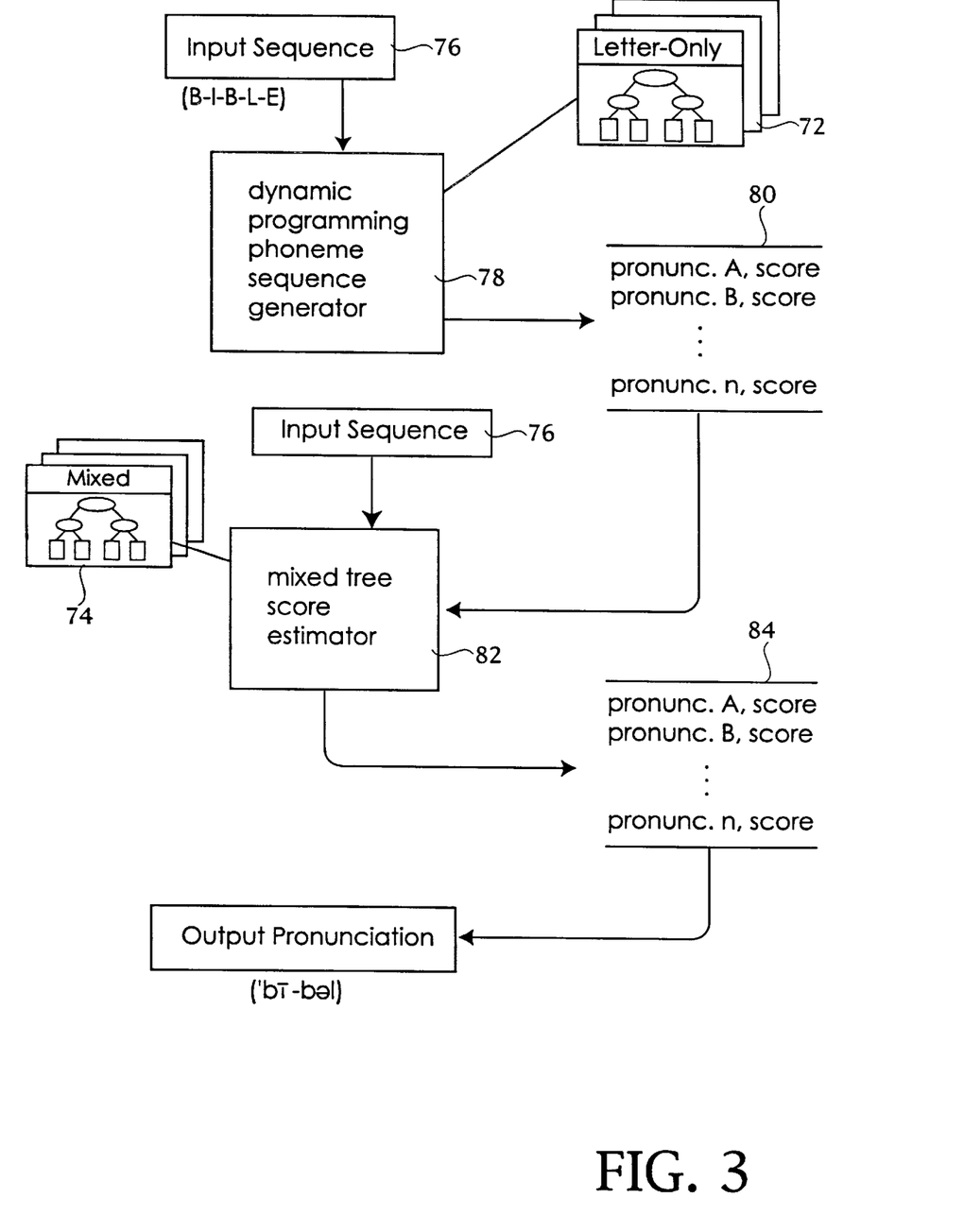
FIG. 3 is a block diagram illustrating the presently preferred phoneticizer using decision trees.

An exemplary embodiment of phoneticizer 24 is shown in FIG. 3 to illustrate the principles of generating multiple pronunciations based on the spelled form of a word. Heretofore, most attempts at spelled word-to-pronunciation techniques transcription have relied solely upon the letters themselves. For some languages, letter-only pronunciation generators yield satisfactory results; for others (particularly English), the results may be unsatisfactory. For example, a letter-only pronunciation generator would have great difficulty properly pronouncing the word bible. Based on the sequence of letters only, the letter-only system would likely pronounce the word "BIB-L", much as a grade school child learning to read might do. The fault in conventional systems lies in the inherent ambiguity imposed by the pronunciation rules of many languages. The English language, for example, has hundreds of different of pronunciation rules making it difficult and computationally expensive to approach the problem on a word-by-word basis.

Therefore, the presently preferred phoneticizer 24 is a pronunciation generator employing two stages, the first stage employing a set of letter-only decision trees 72 and the second, optional stage, employing a set of mixed-decision trees 74. Depending on the language and the application, we may implement only the first stage (taking as output the pronunciations shown at 80), or implement both stages and take the pronunciations output at 84. An input sequence 76, such as the sequence of letters B-I-B-L-E, is fed to a dynamic programming phoneme sequence generator 78. The sequence generator 78 uses the letter-only trees 72 to generate a list of pronunciations 80, representing possible pronunciation candidates of the spelled word input sequence.

Figure 4:
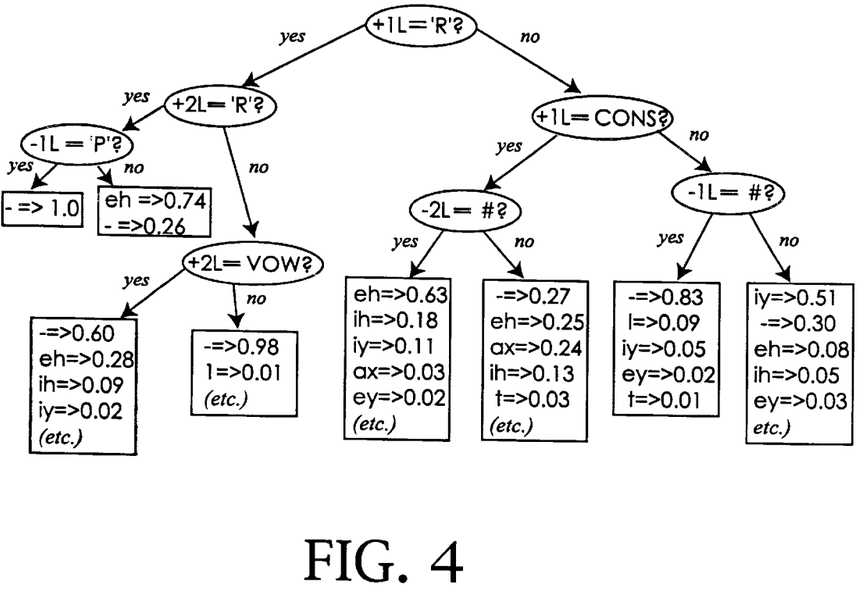
FIG. 4 is a tree diagram illustrating a letter-only tree used in relation to the phoneticizer.

The sequence generator 78 sequentially examines each letter in the sequence, applying the decision tree associated with that letter to select a phoneme pronunciation for that letter based on probability data contained in the letter-only tree. Preferably, the set of letter-only decision trees includes a decision tree for each a letter in the alphabet. FIG. 4 shows an example of a letter-only decision tree for the letter E. The decision tree comprises a plurality of internal nodes (illustrated as ovals in the Figure), and a plurality of leaf nodes (illustrated as rectangles in the Figure). Each internal node is populated with a yes-no question. Yes-no questions are questions that can be answered either yes or no. In the letter-only tree these questions are directed to the given letter (in this case the letter E), and its neighboring letters in the input sequence. Note in FIG. 4 that each internal node branches either left or right, depending on whether the answer to the associated question is yes or no.

Abbreviations are used in FIG. 4 as follows: numbers in questions, such as "+1" or "−1" refer to positions in the spelling relative to the current letter. For example, "+1L== 'R'?" means "Is the letter after the current letter (which, in this case, is the letter E) an R?" The abbreviations CONS and VOW represent classes of letters, namely consonants and vowels. The absence of a neighboring letter, or null letter, is represented by the symbol −, which is used as a filler or placeholder where aligning certain letters with corresponding phoneme pronunciations. The symbol # denotes a word boundary.

The leaf nodes are populated with probability data that associate possible phoneme pronunciations with numeric values representing the probability that the particular phoneme represents the correct pronunciation of the given letter. For example, the notation "iy=>0.51" means "the probability of phoneme 'iy' in this leaf is 0.51." The null phoneme, i.e., silence, is represented by the symbol '−'.

The sequence generator 78 (FIG. 3) thus uses the letter-only decision trees 72 to construct one or more pronunciation hypotheses that are stored in list 80. Preferably, each pronunciation has associated with it a numerical score arrived at by combining the probability scores of the individual phonemes selected using the decision tree 72. Word pronunciations may be scored by constructing a matrix of possible combinations and then using dynamic programming to select the n-best candidates. Alternatively, the n-best candidates may be selected using a substitution technique that first identifies the most probable transcription candidate and then generates additional candidates through iterative substitution as follows:

The pronunciation with the highest probability score is selected first by multiplying the respective scores of the highest-scoring phonemes (identified by examining the leaf nodes), and then using this selection as the most probably candidate or first-best word candidate. Additional (n-best) candidates are then selected, by examining the phoneme data in the leaf nodes again to identify the phoneme not previously selected, that has the smallest difference from an initially selected phoneme. This minimally-different phoneme is then substituted for the initially selected one to thereby generate the second-best word candidate. The above process may be repeated iteratively until the desired number of n-best candidates have been selected. List 80 may be sorted in descending score order so that the pronunciation judged the best by the letter-only analysis appears first in the list.

As noted above, a letter-only analysis will frequently produce poor results. This is because the letter-only analysis has no way of determining at each letter what phoneme will be generated by subsequent letters. Thus, a letter-only analysis can generate a high scoring pronunciation that actually would not occur in natural speech. For example, the proper name, Achilles, would likely result in a pronunciation that phoneticizes both "ll's": ah-k-ih-l-l-iy-z. In natural speech, the second "l" is actually silent: ah-k-ih-l-iy-z. The sequence generator using letter-only trees has no mechanism to screen out word pronunciations that would never occur in natural speech.

Figure 5:
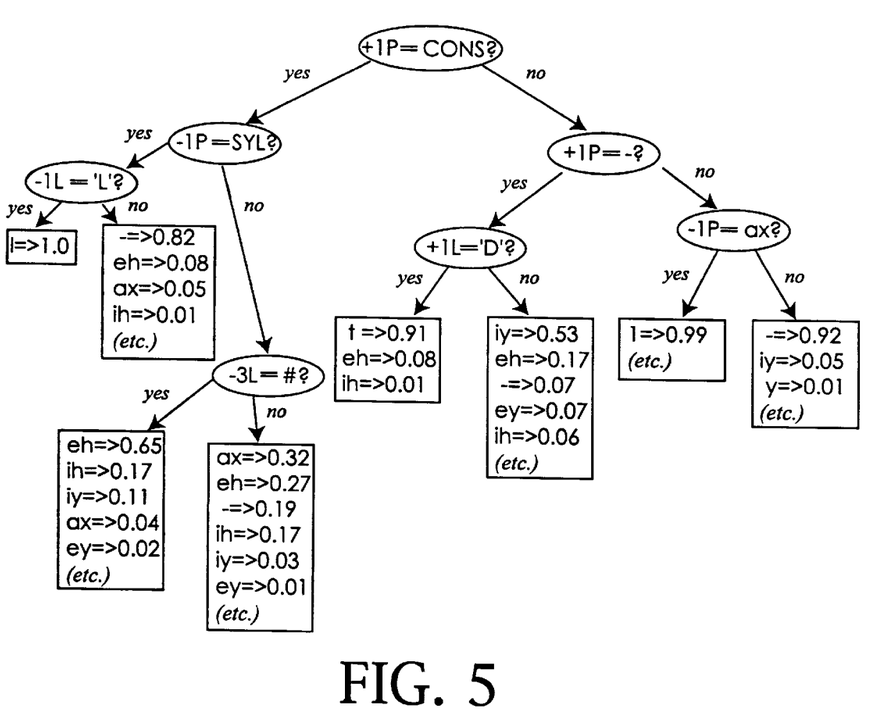
FIG. 5 is a tree diagram illustrating a mixed tree in accordance with the present invention.

The second stage of the phoneticizer 24 addresses the above problem. A mixed-tree score estimator 82 uses the set of mixed-decision trees 74 to assess the viability of each pronunciation in list 80. The score estimator works by sequentially examining each letter in the input sequence along with the phonemes assigned to each letter by sequence generator 78. Like the set of letter-only trees, the set of mixed trees has a mixed tree for each letter of the alphabet. An exemplary mixed tree is shown in FIG. 5. Like the letter-only tree, the mixed tree has internal nodes and leaf nodes. The internal nodes are illustrated as ovals and the leaf nodes as rectangles in FIG. 5. The internal nodes are each populated with a yes-no question and the leaf nodes are each populated with probability data. Although the tree structure of the mixed tree resembles that of the letter-only tree, there is one important difference. The internal nodes of the mixed tree can contain two different classes of questions. An internal node can contain a question about a given letter and its neighboring letters in the sequence, or it can contain a question about the phoneme associated with that letter and neighboring phonemes corresponding to that sequence. The decision tree is thus mixed, in that it contains mixed classes of questions.

The abbreviations used in FIG. 5 are similar to those used in FIG. 4, with some additional abbreviations. The symbol L represents a question about a letter and its neighboring letters. The symbol P represents a question about a phoneme and its neighboring phonemes. For example, the question "+1L=='D'?" means "Is the letter in the +1 position a 'D'?" The abbreviations CONS and SYL are phoneme classes, namely consonant and syllabic. For example, the question "+1P==CONS?" means "Is the phoneme in the +1 position a consonant?" The numbers in the leaf nodes give phoneme probabilities as they did in the letter-only trees.

The mixed-tree score estimator rescores each of the pronunciations in list 80 based on the mixed-tree questions and using the probability data in the lead nodes of the mixed trees. If desired, the list of pronunciations may be stored in association with the respective score as in list 84. If desired, list 84 can be sorted in descending order so that the first listed pronunciation is the one with the highest score.

In many instances, the pronunciation occupying the highest score position in list 80 will be different from the pronunciation occupying the highest score position in list 84. This occurs because the mixed-tree score estimator, using the mixed trees 74, screens out those pronunciations that do not contain self-consistent phoneme sequences or otherwise represent pronunciations that would not occur in natural speech.

Figure 6:
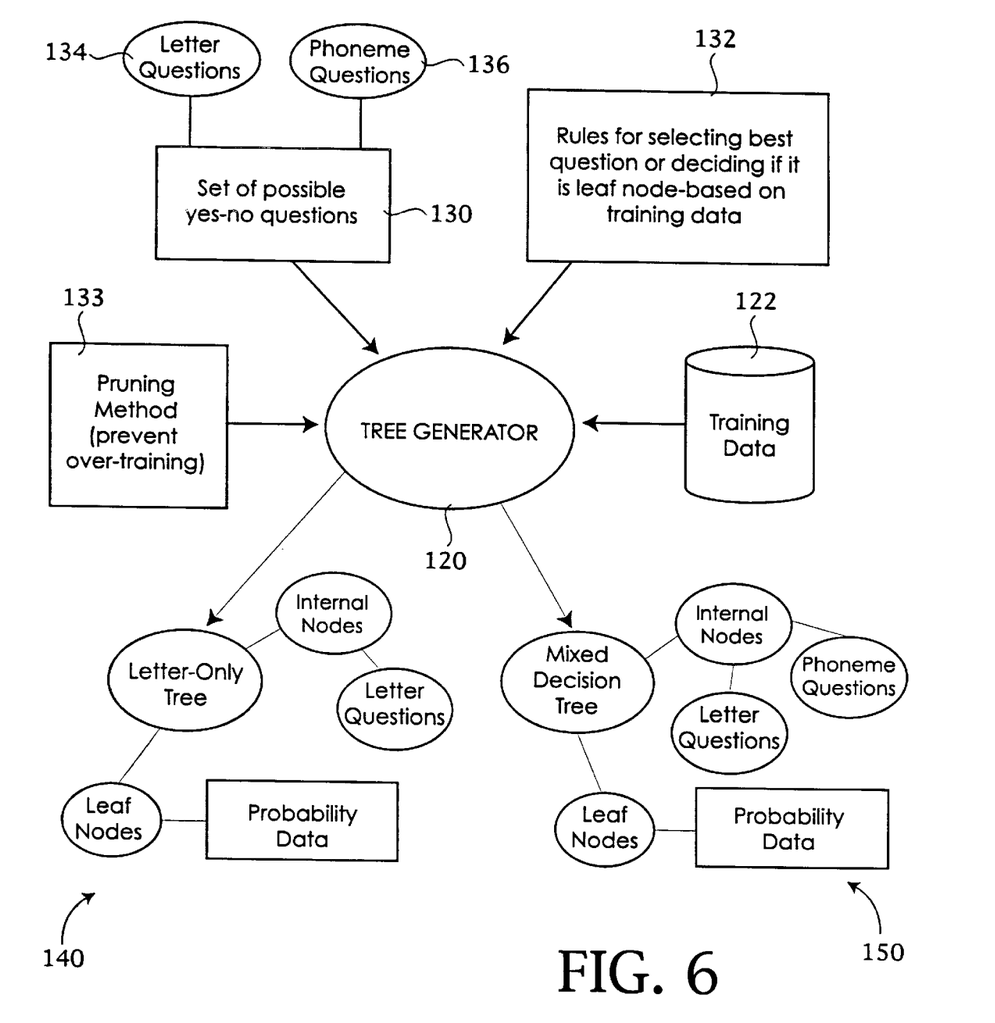
FIG. 6 is a block diagram illustrating a system for generating decision trees in accordance with the present invention.
Figure 7:
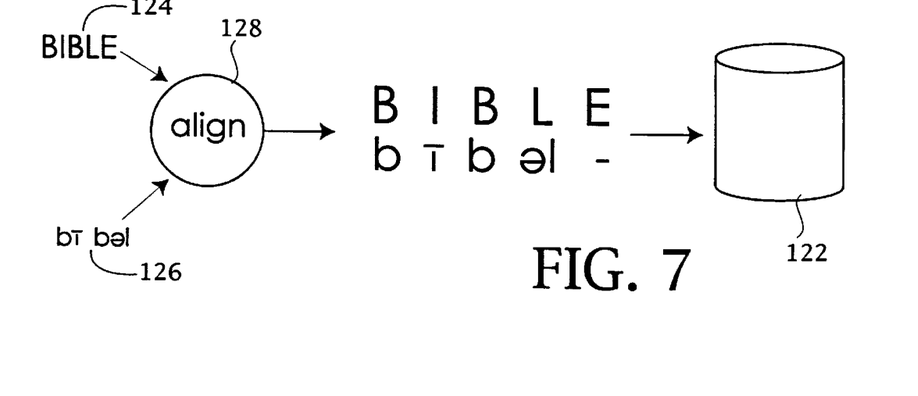
FIG. 7 is a flowchart showing a method for generating training data through an alignment process in accordance with the present invention.

The system for generating the letter-only trees and the mixed trees is illustrated in FIG. 6. At the heart of the decision tree generation system is tree generator 120. The tree generator 120 employs a tree-growing algorithm that operates upon a predetermined set of training data 122 supplied by the developer of the system. Typically the training data 122 comprise aligned letter, phoneme pairs that correspond to known proper pronunciations of words. The training data 122 may be generated through the alignment process illustrated in FIG. 7. FIG. 7 illustrates an alignment process being performed on an exemplary word BIBLE. The spelled word 124 and its pronunciation 126 are fed to a dynamic programming alignment module 128 which aligns the letters of the spelled word with the phonemes of the corresponding pronunciation. Note in the illustrated example the final E is silent. The letter phoneme pairs are then stored as data 122.

Returning to FIG. 6, the tree generator 120 works in conjunction with three additional components: a set of possible yes-no questions 130, a set of rules 132 for selecting the best questions for each node or for deciding if the node should be a lead node, and a pruning method 133 to prevent over-training.

The set of possible yes-no questions may include letter questions 134 and phoneme questions 136, depending on whether a letter-only tree or a mixed tree is being grown. When growing a letter-only tree, only letter questions 134 are used; when growing a mixed tree both letter questions 134 and phoneme questions 136 are used.

The rules for selecting the best question to populate at each node in the presently preferred embodiment are designed to follow the Gini criterion. Other splitting criteria can be used instead. For more information regarding splitting criteria reference Breiman, Friedman et al, "Classification and Regression Trees." Essentially, the Gini criterion is used to select a question from the set of possible yes-no questions 130 and to employ a stopping rule that decides when a node is a leaf node. The Gini criterion employs a concept called "impurity." Impurity is always a non-negative number. It is applied to a node such that a node containing equal proportions of all possible categories has maximum impurity and a node containing only one of the possible categories has a zero impurity (the minimum possible value). There are several functions that satisfy the above conditions. These depend upon the counts of each category within a node Gini impurity may be defined as follows. If C is the set of classes to which data items can belong, and T is the current tree node, let f(1|T) be the proportion of training data items in node T that belong to class 1, f(2|T) the proportion of items belonging to class 2, etc.

$$i(T) = \sum_{j,k \in C, j \ne k} f(j|T)f(k|T) = 1 \sum_{j} [f(j|T)]2.$$

To illustrate by example, assume the system is growing a tree for the letter "E." In a given node T of that tree, the system may, for example, have 10 examples of how "E" is pronounced in words. In 5 of these examples, "E" is pronounced "iy" (the sound "ee" in "cheeze"); in 3 of the examples "E" is pronounced "eh" (the sound of "e" in "bed"); and in the remaining 2 examples, "E" is "–" (i.e., silent as in "e" in "maple").

Assume the system is considering two possible yes-no questions, $Q_1$ and $Q_2$ that can be applied to the 10 examples. The items that answer "yes" to $Q_1$ include four examples of "iy" and one example of "–" (the other five items answer "no" to $Q_1$.) The items that answer "yes" to $Q_2$ include three examples of "iy" and three examples of "eh" (the other four items answer "no" to $Q_2$). FIG. 6 diagrammatically compares these two cases.

The Gini criterion answers which question the system should choose for this node, $Q_1$ or $Q_2$. The Gini criterion for choosing the correct question is: find the question in which the drop in impurity in going from parent nodes to children nodes is maximized. This impurity drop $\Delta T$ is defined as $\Delta|=i(T)-p_{yes}*i(yes)-p_{no}*i(no)$, where $P_{yes}$ is the proportion of items going to the "yes" child and $P_{no}$ is the proportion of items going to the "no" child.

Applying the Gini criterion to the above example:

$$i(T) = 1 - \sum_{j} [f(j|T)]^2 = 1 - 0.5^2 - 0.3^2 - 0.2^2 = 0.62$$

$\Delta|$ for $Q_1$ is thus:
 i(T)–$P_{yes}(Q_1)$=1–0.8²–0.2²=0.32
 i(T)–$P_{no}(Q_1)$=1–0.2²0.6²=0.56
So $\Delta|(Q_1)$=0.62–0.5*0.32–0.5*0.56=0.18.
 For $Q_2$, we have |(yes, $Q_2$)=1–0.5²–0.5²=0.5, and for i(no, $Q_2$)=(same)=0.5.
So, $\Delta|(Q_2)$=0.6–(0.6)*(0.5)–(0.4)*(0.5)=0.12. In this case, $Q_1$ gave the greatest drop in impurity. It will therefore be chosen instead of $Q_2$.

The rule set 132 declares a best question for a node to be that question which brings about the greatest drop in impurity in going from the parent node to its children.

The tree generator applies the rules 132 to grow a decision tree of yes-no questions selected from set 130. The generator will continue to grow the tree until the optimal-sized tree has been grown. Rules 132 include a set of stopping rules that will terminate tree growth when the tree is grown to a pre-determined size. In the preferred embodiment the tree is grown to a size larger than ultimately desired. Then pruning methods 133 are used to cut back the tree to its desired size. The pruning method may implement the Breiman technique as described in the reference cited above.

The tree generator thus generates sets of letter-only trees, shown generally at 140 or mixed trees, shown generally at 150, depending on whether the set of possible yes-no questions 130 includes letter-only questions alone or in combination with phoneme questions. The corpus of training data 122 comprises letter, phoneme pairs, as discussed above. In growing letter-only trees, only the letter portions of these pairs are used in populating the internal nodes. Conversely, when growing mixed trees, both the letter and phoneme components of the training data pairs may be used to populate internal nodes. In both instances the phoneme portions of the pairs are used to populate the leaf nodes. Probability data associated with the phoneme data in the lead nodes are generated by counting the number of occurrences a given phoneme is aligned with a given letter over the training data corpus.

In one embodiment of the present invention, the editor 10 is adaptive or self-learning. One or more spelled word-pronunciation pairs are used to update lexicon 14 as well as to supply new training data upon which the phoneticizer 24 may be retrained or updated. This can be accomplished by using the word-pronunciation pairs as new training data 122 for generating revised decision trees in accordance with the above-described method. Therefore, the self-learning embodiment improves its phonetic transcription generation over time, resulting in even higher quality transcriptions.

The foregoing discloses and describes merely exemplary embodiments of the present invention. One skilled in the art will readily recognize from such discussion, and from accompanying drawings and claims, that various changes, modifications, and variations can be made therein without the departing from the spirit and scope of the present invention.

What is claimed is:

1. A system for developing word-pronunciation pairs based on a spelled word input, comprising:
   a transcription generator receptive of the spelled word input for generating a phonetic transcription that corresponds to the spelled word input, said phonetic transcription being segmented into syllabic portions;
   a phoneticizer receptive of the spelled word input for producing a plurality of scored phonetic transcriptions, where the phoneticizer employs letter-only decision trees and phoneme-mixed decision trees to produce said plurality of scored phonetic transcriptions, the letter-only decision trees having nodes representing questions about a given letter and neighboring letters in the spelled word input and the phoneme-mixed decision trees having nodes representing questions about a phoneme and neighboring phonemes in the spelled word input;
   a phonemic editor connected to said transcription generator for displaying and editing syllabic portions of said phonetic transcription and connected to said phoneticizer for displaying said plurality of scored phonetic transcriptions; and
   a storage mechanism for updating a lexicon with the spelled word input and said phonetic transcription, thereby developing the desired word-pronunciation pair.

2. The system of claim 1 wherein said transcription generator accesses a dictionary to generate said phonetic transcription, the dictionary storing phonetic transcription data corresponding to a plurality of spelled words.

3. The system of claim 1 wherein said transcription generator using letter-to-sound rules to produce said phonetic transcription.

4. The system of claim 1 wherein said phonetic transcription further includes accentuation data for the spelled word input.

5. The system of claim 4 wherein said dictionary storing accentuation data corresponding to each of the plurality of spelled words and said phonemic editor being operative to display and edit the accentuation data associated with said phonetic transcription.

6. The system of claim 1 wherein said phonemic editor provides a language selection mechanism and said transcription generator being connected to a plurality of dictionaries each of which stores phonetic transcription data in a different language, whereby said transcription generator invokes one of said plurality of dictionaries to produce a phonetic transcription that corresponds to the language from said language selection mechanism.

7. The system of claim 1 further includes a pronunciation selection mechanism connected to said phonemic editor for selecting at least one of said plurality of scored phonetic transcriptions.

8. The system of claim 7 wherein said pronunciation selection mechanism provides at least one of said plurality of scored phonetic transcriptions for updating said decision trees.

9. The system of claim 1 wherein the spelled word input and said phonetic transcription stored in said lexicon being used to retrain said transcription generator.

10. The system of claim 1 further includes a speech recognizer connected to said phonemic editor and receptive of speech data corresponding to the spelled word input for rescoring said plurality of scored phonetic transcriptions based on said speech data.

11. The system of claim 1 further includes a speech recognizer receptive of speech data corresponding to the spelled word input and being operative to produce the spelled word input, whereby said transcription generator receptive of the spelled word input from said speech recognizer.

12. The system of claim 1 further includes a speech recognizer receptive of speech data for producing a sounds-like word corresponding to the speech data, such that said phonemic editor being operative to provide a sounds-like phonetic transcription that corresponds to the sounds-like word and replace at least one syllabic portion of said phonetic transcription with said sounds-like phonetic transcription.

13. The system of claim 1 further includes a text-to-speech synthesizer connected to said phonemic editor and receptive of said phonetic transcription for generating speech data.

14. A system for developing word-pronunciation pairs based on a spelled word input, comprising:
   a dictionary for storing phonetic transcription data corresponding to a plurality of spelled words;
   a transcription generator connected to said dictionary and receptive of the spelled word input for producing a phonetic transcription that corresponds to the spelled word input, said phonetic transcription being segmented into syllabic portions;
   a phoneticizer receptive of the spelled word input for producing a plurality of scored phonetic transcriptions, where the phoneticizer employs letter-only decision trees and phoneme-mixed decision trees to produce said plurality of scored phonetic transcriptions, the letter-only decision trees having nodes representing questions about a given letter and neighboring letters in the spelled word input and the phoneme-mixed decision trees having nodes representing questions about a phoneme and neighboring phonemes in the spelled word input; and a phonemic editor connected to said transcription generator for displaying and editing syllabic portions of said phonetic transcription and connected to said phoneticizer for displaying said plurality of scored phonetic transcriptions, thereby developing the desired word-pronunciation pair.

15. The system of claim 14 wherein said transcription generator being operative to produce said phonetic transcription using letter-to-sound rules.

16. The system of claim 14 further includes a storage mechanism for updating a lexicon with the spelled word and said phonetic transcription.

17. The system of claim 14 wherein said phonetic transcription further includes accentuation data for the spelled word input.

18. The system of claim 17 wherein said dictionary storing accentuation data corresponding to each of the plurality of spelled words and said phonemic editor being operative to display and edit the accentuation data associated with said phonetic transcription.

19. The system of claim 14 wherein the spelled word and said phonetic transcription being used to retrain said transcription generator.

20. The system of claim 14 wherein said phonemic editor provides a language selection mechanism and said transcription generator being connected to a plurality of dictionaries each of which stores phonetic transcription data in a different language, whereby said transcription generator invokes one of said plurality of dictionaries to produce a phonetic transcription that corresponds to the language from said language selection mechanism.

21. The system of claim 14 further includes a pronunciation selection mechanism connected to said phonemic editor for selecting at least one of said plurality of scored phonetic transcriptions.

22. The system of claim 21 wherein said pronunciation selection mechanism provides at least one of said plurality of scored phonetic transcriptions for updating said decision trees.

23. The system of claim 14 further includes a speech recognizer connected to said phonemic editor and receptive of speech data corresponding to the spelled word input for rescoring said plurality of scored phonetic transcriptions based on said speech data.

24. The system of claim 14 further includes a speech recognizer receptive of speech data corresponding to the spelled word input and being operative to produce the spelled word input, whereby said transcription generator receptive of the spelled word input of said speech recognizer.

25. The system of claim 14 further includes a speech recognizer receptive of speech data for producing a sounds-like word corresponding to the speech data, such that said phonemic editor being operative to provide a sounds-like phonetic transcription that corresponds to the sounds-like word and replace at least one syllabic portion of said phonetic transcription with said sounds-like phonetic transcription.

26. The system of claim 14 further includes a text-to-speech synthesizer connected to said phonemic editor and receptive of said phonetic transcription for generating speech data.

* * * * *